United States Patent [19]

VanAuken

[11] 4,047,731
[45] Sept. 13, 1977

[54] BICYCLE FRAME

[75] Inventor: Richard L. VanAuken, Bridgewater, N.J.

[73] Assignee: Exxon Research and Engineering Company, Linden, N.J.

[21] Appl. No.: 721,979

[22] Filed: Sept. 10, 1976

[51] Int. Cl.² .................................................. B62K 3/04
[52] U.S. Cl. ............................. 280/281 B; 138/172; 273/DIG. 3; 428/36
[58] Field of Search ............... 280/281; 428/109, 110, 428/107, 112, 114, 902, 294, 295, 36; 52/693, 727, 309.1; 138/141, 172, 144; 273/DIG. 1, DIG. 3

[56] References Cited

U.S. PATENT DOCUMENTS

| | | | |
|---|---|---|---|
| 1,998,994 | 4/1935 | Lewis | 280/281 |
| 2,755,873 | 7/1956 | Klave | 280/281 X |
| 2,827,306 | 3/1958 | Roder | 280/281 |
| 2,969,812 | 1/1961 | Ganahl | 138/144 X |
| 3,030,124 | 4/1962 | Holloway | 280/281 |
| 3,321,357 | 5/1967 | Kennedy | 428/109 |
| 3,335,049 | 8/1967 | Pultz | 428/367 |
| 3,893,681 | 7/1975 | Manning et al. | 428/112 X |
| 3,972,529 | 8/1976 | McNeil | 428/367 X |

Primary Examiner—Philip Goodman
Assistant Examiner—J. D. Rubenstein
Attorney, Agent, or Firm—Joseph J. Dvorak

[57] ABSTRACT

A novel bicycle frame has a plurality of tubular elements interconnected with lugs to a generally diamond shape. The tubular elements have a metal core and a fiber-reinforced plastic skin. The fibers in the skin have a specific predetermined angle of orientation whereby the bending and torsional characteristics are balanced to enhance the stability and strength of the frame at significantly low weights.

6 Claims, 5 Drawing Figures

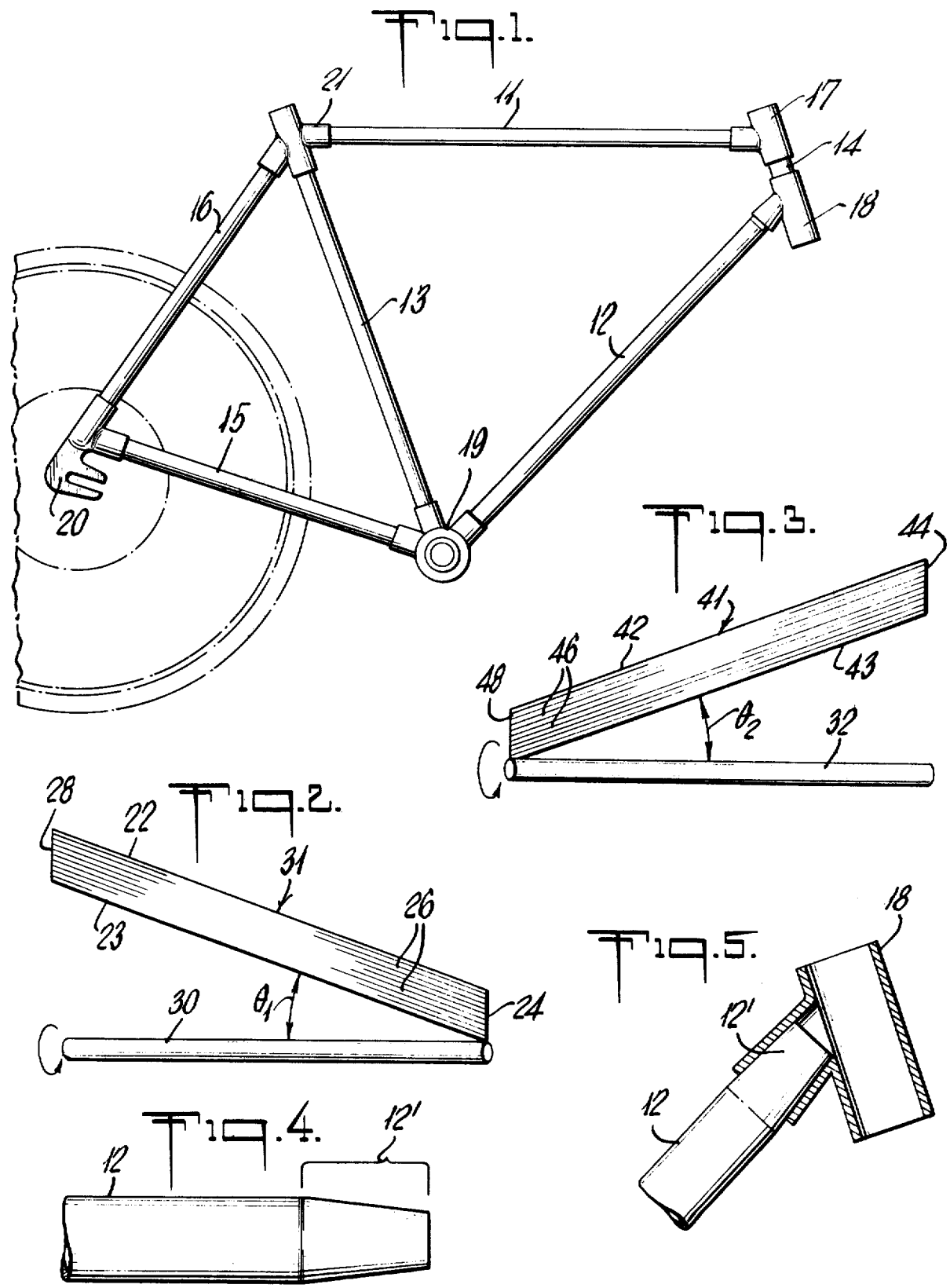

BICYCLE FRAME

BACKGROUND OF THE INVENTION

1. Field of the Invention

This invention relates to bicycle frames, and more particularly to bicycle frames of the tubular type for light-weight, high performance bicycles.

2. Prior Art

Evolution of the technological development of bicycles has been summarized in Scientific American, pages 81-91, Mar. 1973 by S. Wilson. As noted therein, notwithstanding the fact that the classic diamond shaped frame takes much of the riding strains directly, such a frame is still subject to bending and torsional stresses, particularly when the rider exerts pressure first on one pedal and then the second pedal. Also noted in the article is the fact that tubular construction has been employed for bicycle frames, particularly for racing bicycles, in order to reduce the weight of the bicycle. This concern with frame rigidity and bike weight are two interrelated factors which are most significant, particularly for high performance racing bicycles. The lower the bike weight, the greater the pedalling responsiveness of the bicycle. Similarly, the more rigid the frame, the greater the pedalling ease. For racing bikes, lightweight, high strength materials such as titanium and other alloys have been proposed for the tubular elements of the bicycle frame. Practical experience has shown, however, that, notwithstanding the fact that individual tubular elements through modern metallurgical techniques can be made exceedingly stiff, the bicycle frame having classical diamond shape constructed from such tubular materials nonetheless is very whippy when tested under racing conditions. Indeed, considerable instability is manifested by bicycles which are constructed from such types of tubular members.

SUMMARY OF THE INVENTION

According to the invention, a frame for bicycles comprising a plurality of tubular elements interconnected to form the frame by connecting angle elements, each of said tubular elements having bonded to the surface thereof a fiber-reinforced skin of resin in which skin the fibers are oriented at a predetermined angle of orientation with respect to the longitudinal axis of each tubular element whereby the bending and torsional characteristics of each tubular element in the bicycle frame are balanced with respect to each other, thereby increasing the stability of said bicycle frame.

These and other features of the present invention will become apparent from the following Detailed Description of an exemplary embodiment of a bicycle frame according to the invention and when taken in conjunction with the accompanying drawings.

BRIEF DESCRIPTION OF THE DRAWINGS

FIG. 1 shows a general bicycle frame according to the invention.

FIGS. 2 and 3 show the technique of forming a fiber-reinforced resin skin on the tubular element used in forming a frame of the present invention.

FIG. 4 is a side elevation of the end portion of a tubular element including the fiber-reinforced skin showing particularly the taper at the end portion of the tube.

FIG. 5 is a longitudinal sectional view showing an angle connection with a tubular element therein.

DETAILED DESCRIPTION OF THE INVENTION

Referring now to FIG. 1, the classical diamond shaped bicycle frame is shown schematically. For the sake of simplicity, other details of bicycles and bicycle frames which are not essential for an understanding of the subject invention, such as the wheels, the drive system to the rear control wheel, the handlebar and steering fork, have been omitted.

As shown in the drawings, the frame therein comprises tubular elements 11, 12, 13 and 14 forming the front portion of the frame. Forming the rear portion or rear fork of the bicycle are a pair of tubular elements 15 and 16 adequately spaced for the mounting of the rear wheel. Angle connecting means 17, 18, 19, 20 and 21 are also shown.

With the exception of the head tube 14, it is particularly preferred that all the tubular metal elements have a core of aluminum. Indeed, for lightweight racing type bicycles it is particularly preferred that the metal of the tubular element be aluminum. Tube 14, however, is advantageously fabricated from steel. Advantageously, also, each of the angle connecting elements or lugs are fabricated from steel.

In order for the bicycle frame to have the requisite strength and performance characteristics, it is necessary that each of the tubular elements have bonded to the surface thereof a fiber-reinforced plastic skin, in which skin the fibers are oriented at a predetermined angle of orientation with respect to the longitudinal axis of the tubular element in such a manner as to balance the bending and torsional characteristics of each tubular element when connected together in the form of a bicycle frame. Thus, in order for the bicycle frame to have the proper strength and rigidity, approximately half of the reinforcing fibers in the skin of the down tube 12 and seat tube 13 and head tube 14 must be oriented at an angle of between about ±25° to about ±45°, with ±45° being particularly preferred. In contrast thereto, the fibers in the reinforcing skin in the seat stays 16 and the chain stays 15 are oriented at 0° with respect to the longitudinal axis of the tubular element, and the fibers in the reinforcing skin of the top tube 11 are between 0° and ±10°, and preferably ±5°, with respect to the longitudinal axis of the tubular element.

As will be readily appreciated, "±" designation with respect to the angle of orientation of the fibers indicates the fibers are cross-plied, i.e. of all the fibers oriented at that specific angle of orientation, approximately half the fibers are oriented at the same angle but in opposite direction of the other half.

For optimum strength and requisite light weight, the fiber in the fiber-reinforced skin will be continuous graphite fiber. The resin of the fiber-reinforced skin is a thermosetting resin. Suitable thermosetting resin materials include epoxy and polyester resins. The epoxy resins are polyepoxides which are well known condensation products or compounds containing oxirane rings with compounds containing hydroxyl groups or active hydrogen atoms such as amines, acids and aldehydes. The most common epoxy resin compounds are those of epichlorohydrin and bisphenol and its homologs.

The polyester resins are polycondensation products, polybasic acids with polyhydric alcohols. Typical polyesters include polyterphthalates such as poly(ethylene)-terphthalate. As is well known in the art, these thermoset resins include modifying agents such as hardeners and the like. Forming such compositions is not a part of the present invention. Indeed, the preferred modified epoxy resin impregnated unidirectional graphite fibers used as skin material are commercially available materials. For example, modified epoxy pre-impregnated graphite fibers are sold under the name of "Rigidite 5209" and "Rigidite 5213" by the Narmco Division of Celanese Corporation, New York, New York. Other commercial sources of the resin pre-impregnated graphite fibers that can be used in practicing this invention are known in the industry.

In fabricating the bicycle frame, the metal tubular elements are first provided with a fiber-reinforced skin, with the fibers oriented in a preferred predetermined angle of orientation with respect to the longitudinal axis of the frame. This skin of resin-impregnated fiber material can most easily be fabricated from various layers of material which are ultimately bonded one to the other by curing of the resin contained therein.

As shown in FIG. 2, an oblong sheet or gore 31 is cut from a sheet of continuous unidirectional graphite fibers impregnated with a plastic resin such as modified epoxy resin. As is shown in FIG. 2, this gore 31 is cut in the form of a parallelogram such that the continuous unidirectional graphite fibers are parallel to lengthwise edges 22 and 23. In gore 31, the angle of orientation that the fibers 26 have with respect to end edge 24 will determine the angle of orientation with respect to the longitudinal axis of tubular element 30, when the tubular element is wrapped in the manner described hereinafter. It should be noted that it is most advantageous that gore 31 have a length equal to the length of the tubular element to be wrapped and the width of gore 31 is preferably equal to the circumference of the tube to be wrapped. Particularly, also, gore 31 would have a thickness of about 0.007 to about 0.01 inches and contain from about 50 to 60 volume % of graphite fibers in the thermoset resin matrix. Preferably, the gore 31 used in the present invention has 54 to 58 volume % graphite fibers in an epoxy resin matrix. In providing the tubular element 30 with the requisite fiber-reinforced skin, the tubular element 30 is first coated with a suitable structural adhesive. The metal adhesive used is a material employed for bonding plastics to metal such as elastomeric modified epoxy and elastomeric modified phenol-urea type resins. One example of one type of adhesive is a polysulfide elastomer modified epichlorohydrin bisphenol resin. Many structural adhesives are commercially available, one of which is known as Metlbond 133 which is an elastomer modified epoxy material sold by the Narmco Division of Celanese Corporation, New York, N.Y. Another is FM 123-2 sold by American Cyanamid Company, Wayne, New Jersey. The structural metal adhesive is applied so as to cover the entire circumference of the metal tube 30. When the adhesive is a thin film sheet material such as Metlbond 1133, an oblong layer of adhesive film can be cut and wrapped around the metal tube 30 so as to cover the entire surface thereof. Then a gore such as gore 31 shown in FIG. 2 is cut from a sheet of unidirectional fibers impregnated with the plastic resin. The metal tube 30 with its adhesive layer is positioned with respect to gore 31 as shown in FIG. 2 so that the end edge of the gore 24 lines up with the end edge of tube 30, thereby forming an angle, $\theta_1$, with respect to the tube and the lengthwise edge 23 of gore 31. This angle, $\theta_1$, for example, is most desirably 45° with respect to the tube. Tube 30 is then rolled onto gore 31 so as to wrap the tube 30 in the sheet of fiber impregnated resin material.

Turning again to the drawings, as can be seen in FIG. 3, the second gore 41 is cut from the resin impregnated unidirectional graphite fiber material in the shape of a parallelogram. Indeed, in gore 41 the continuous graphite fibers 46 are parallel to the lengthwise edges 42 and 43. Tubular element 32 is so arranged with respect to end edge 48 that the angle of orientation of the graphite fibers is of the same magnitude as shown in FIG. 2 but of opposite sign. Tubular element 32 consists of the aluminum metal core with its coating of structural metal adhesive and the first layer of fiber-reinforced sheet material provided by wrapping gore 31 around the aluminum metal core having an adhesive layer thereon. By rolling tube 32 onto flat gore 41 a second layer of continuous graphite fiber-reinforced plastic sheet material is applied to the surface of the metal tube. The foregoing described operation can be repeated any number of times depending upon the number of plies of fiber-reinforced sheet material to be applied to the metal tube. The angle of orientation of the fibers can be varied by altering the angle of the flat pattern.

After wrapping the metal core with the requisite layers of material it simply is placed in an oven and heated to a temperature sufficient to cause a bonding of the separate layers in the various convolutions to each other. The temperature at which the assembly is heated depends upon a number of factors including the resin which is used to impregnate the graphite fibers. These temperatures are well known. Typically, for modified epoxy resin-impregnated graphite fiber the temperature will be in the range of about 100° to about 180° C and preferably at about 140° C. Prior to heating an external polypropylene wrapping film can be used to hold the various layers around the metal core and this can be removed very simply by manually peeling it away from the surface.

Indeed, if more than the two plies of sheet material are employed, it is advantageous after applying two plies of sheet material to a metal core to wrap the assembly with a polypropylene wrapping film and warm the so-wrapped material to 110° C for several minutes to compact and then bond the initial layers to the core. Thereafter, the assembly can be cooled to room temperature and the polypropylene wrapping film removed and additional plies of material applied in the same manner.

As indicated hereinabove, head tube 14, seat tube 13, and down tube 12 will have about half the fibers in the plastic skin oriented at an angle of between ±25° to ±45° and preferably with the fibers oriented at an angle of ±45°. The top tube 11 will have at least half the fibers in the plastic skin oriented at an angle of between 0° to ±10°, with ±5° being preferred.

In fabricating the seat tube, it is particularly preferred that two-thirds of the fibers in the seat tube be oriented at an angle of ±45° with respect to the longitudinal axis of the tube and approximately one-third of the fibers be oriented at 0° with respect to the longitudinal axis of the tube.

It is particularly preferred in fabricating down tube 12 that it have about one-half of the fibers in the reinforcing skin oriented at ±45° with respect to the longitudinal axis of the tube and one-fourth of the fibers at ±25° with respect to the longitudinal axis of the tube, the balance being at 0° or ±5° with respect to the longitudinal axis of the tube.

In fabricating top tube 11 it is particularly preferred that substantially all the fibers be oriented at an angle of about ±5° with respect to the longitudinal axis of the tube.

In fabricating head tube 14 it is preferred that approximately half of the fibers be oriented at ±45° with respect to the longitudinal axis of the tube and the balance be oriented at 0° with respect to the longitudinal axis of the tube.

With respect to chain stays 15, the graphite fibers are oriented substantially all longitudinally, i.e. at 0° with respect to the longitudinal axis of the tube.

In fabricating the seat stays, at least half the fibers are oriented longitudinally or at 0° with respect to the longitudinal axis of the tube. As much as one-third may be oriented at about ±10° with respect to the longitudinal axis of the tube.

Returning again to FIG. 1, each of the tubular elements described hereinabove are bonded one to the other in a frame assembly by means of angle connecting elements or lugs. Angle connecting means 20, also referred to as a rear dropout, is provided with a groove for receiving the axle of the rear wheel so that it can be suitably bolted in place. The bottom bracket 19, of course, is provided with suitable openings for receiving the drive portion of the pedal mechanism. Seat lug 21 is preferably designed to also receive the standard to which the seat is attached. Bottom lugs 17 and 18, respectively, are provided with openings for receiving the standard for the steering fork of the ultimately assembled bicycle.

As is shown in FIG. 4, down tube 12 which has the fiber-reinforced plastic skin on the surface thereof has been ground to a suitable taper at end 12' so as to mate with the female portion of lug 18. This taper is most important in having an adequate bond between the angle connecting elements and the tubular elements. In assembling the frame, a two-part liquid epoxy resin can be used as a structural adhesive so as to bond the tubular element with the angle connecting means.

Among the significant advantages of the present invention is the balance that is achieved between torsional and bending stiffness at significantly low frame weights. Also, the bicycle of the present invention has been found to exhibit significantly less vibration transmission to experienced riders over rugged terrains. Consequently, not only is performance enhanced but rider fatigue is reduced and frame life is increased.

What is claimed is:

1. A bicycle frame comprising a plurality of tubular elements interconnected to form a generally diamond shaped structure including a head tube, a seat tube, a down tube, a top tube, two seat stays and two chain stays, said head tube, seat tube, down tube having a metal core and a fiber-reinforced plastic skin on the surface thereof at least half of the fibers of which are oriented at an angle of ±45° with respect to the longitudinal axis of the tube, and said top tube having a metal core and a fiber-reinforced skin bonded to the surface thereof, said fibers in said top tube being oriented at an angle of about 0° to ±10° with respect to the longitudinal axis of the core, and said seat stays and chain stays having a tubular metal core and a fiber-reinforced skin bonded to the surface thereof, said fibers being oriented at an angle of about 0° with respect to the longitudinal axis of the tubular core.

2. A bicycle frame comprising: a head tube, a seat tube, a down tube, a top tube, two seat stays and two chain stays interconnected by lugs into a generally diamond shape, said top tube having an aluminum metal core and a continuous unidirectional graphite fiber reinforced plastic resinous skin bonded to the surface of said metal core, said top tube having said fibers oriented at an angle of from about 0° to about ±10° with respect to the longitudinal axis of said top tube; said head tube having a tubular steel core and a fiber-reinforced unidirectional graphite fiber reinforced plastic resin skin bonded to the surface thereof, at least half of said fibers oriented at ±45° with respect to the longitudinal axis of said metal core; said bottom tube having a tubular aluminum metal core and a fiber-reinforced plastic skin bonded to the surface thereof, said fibers being oriented at ±45° with respect to the longitudinal axis of the core, said seat tube having a tubular aluminum metal core with continuous graphite fiber reinforced plastic skin bonded to the surface thereof, said graphite fiber reinforced plastic skin having at least half the fibers oriented at an angle of ±45° with respect to the longitudinal axis of the core; said chain stays having an aluminum tubular metal core and a continuous graphite fiber reinforced plastic skin bonded to the surface thereof, said fibers in said skin being oriented at an angle of 0° with respect to the longitudinal axis of said chain stays; said seat stays having a tubular aluminum metal core and a fiber-reinforced plastic skin bonded to the surface thereof, said fibers being oriented at an angle of 0° with respect to the longitudinal axis of said seat stays.

3. The bicycle frame of claim 2 wherein all of the fibers in said top tube are oriented at ±5°.

4. The frame of claim 3 wherein half the fibers in said head tube are oriented at ±45° and half the fibers are oriented at 0°.

5. The frame of claim 4 wherein half the fibers in said down tube are oriented at ±45° and a quarter of said fibers are oriented at ±25° and the balance are oriented at 0° to ±5° with respect to the longitudinal axis of the tube.

6. The bicycle frame of claim 5 wherein two-thirds of the fibers are oriented at ±45° in the seat tube and one-third of the fibers are oriented at 0° to ±5° with respect to the longitudinal axis of the tube.

* * * * *